(12) United States Patent
Shaw et al.

(10) Patent No.: US 11,557,872 B2
(45) Date of Patent: Jan. 17, 2023

(54) MULTI-WAVELENGTH SOURCES BASED ON PARAMETRIC AMPLIFICATION

(71) Applicant: The Government of the United States of America, as represented by the Secretary of the Navy, Arlington, VA (US)

(72) Inventors: L. Brandon Shaw, Woodbridge, VA (US); Rafael R. Gattass, Washington, DC (US); Rajesh Thapa, Manassas, VA (US); Lynda E. Busse, Alexandria, VA (US); Ishwar D. Aggarwal, Waxhaw, NC (US); Daniel L. Rhonehouse, Huntingtown, MD (US); Jasbinder S. Sanghera, Ashburn, VA (US); Jason Auxier, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 552 days.

(21) Appl. No.: 16/545,799

(22) Filed: Aug. 20, 2019

(65) Prior Publication Data

US 2020/0059060 A1 Feb. 20, 2020

Related U.S. Application Data

(60) Provisional application No. 62/765,283, filed on Aug. 20, 2018.

(51) Int. Cl.
*H01S 3/067* (2006.01)
*H01S 3/094* (2006.01)
(Continued)

(52) U.S. Cl.
CPC ............ *H01S 3/06754* (2013.01); *G02F 1/39* (2013.01); *H01S 3/06741* (2013.01);
(Continued)

(58) Field of Classification Search
CPC . G02F 1/39; G02F 1/392; G02F 1/395; H01S 3/06754; H01S 3/094096; H01S 3/06741
See application file for complete search history.

(56) References Cited

U.S. PATENT DOCUMENTS 9,341,920 B1* 5/2016 Reed .......................... G02F 1/39
9,577,401 B2* 2/2017 Shaw ................. G02B 6/02295
(Continued)

OTHER PUBLICATIONS

"Improved parametric generation of light in optical fibers" Jauregui et al., 2011 Conference on Lasers and Electro-Optics Europe and 12th European Quantum Electronics Conference (CLEO EUROPE/EQEC). (Year: 2011).*
(Continued)

*Primary Examiner* — Eric L Bolda
(74) *Attorney, Agent, or Firm* — US Naval Research Laboratory; Suresh Koshy

(57) ABSTRACT

Fiber optic amplification includes a photonic crystal fiber coupled to a pump laser through a first coupler. The pump laser emits a first electromagnetic radiation wave into the photonic crystal fiber at a first oscillation frequency and a second electromagnetic radiation wave into the photonic crystal fiber at a second oscillation frequency equaling the first oscillation frequency. The first and second electromagnetic radiation waves interact to generate a signal comprising an electromagnetic radiation wave at a third oscillation frequency and an idler comprising a fourth electromagnetic radiation wave at a fourth oscillation frequency to be generated and amplified through parametric amplification. Parametric amplification is achieved by four wave mixing. The photonic crystal fiber emits a parametric output signal based (Continued)

on the four wave mixing. A nonlinear crystal frequency doubles the parametric output signal through second-harmonic generation.

11 Claims, 12 Drawing Sheets

(51) Int. Cl.
  *G02F 1/39* (2006.01)
  *H01S 3/108* (2006.01)

(52) U.S. Cl.
  CPC ...... *H01S 3/094096* (2013.01); *H01S 3/1083* (2013.01); *G02F 1/392* (2021.01); *H01S 2301/085* (2013.01)

(56) References Cited

U.S. PATENT DOCUMENTS

| 2004/0125434 A1* | 7/2004 | Kumar | G02F 1/395 |
| | | | 359/330 |
| 2013/0265636 A1* | 10/2013 | Gusev | G02F 1/39 |
| | | | 359/342 |
| 2014/0226140 A1* | 8/2014 | Chuang | H01S 3/0092 |
| | | | 372/22 |
| 2016/0365697 A1* | 12/2016 | Hori | H01S 3/1616 |

OTHER PUBLICATIONS

Murray et al. "Compact and broadly tunable near-visible parametric wavelength converter based on polarization-maintaining photonic-crystal fiber", Optical Society of America, Conference on Lasers and Electro-optics/Quantum Electronics and Laser Science Conference Technical Digest, paper CTu2E.3 (Year: 2013).*

* cited by examiner

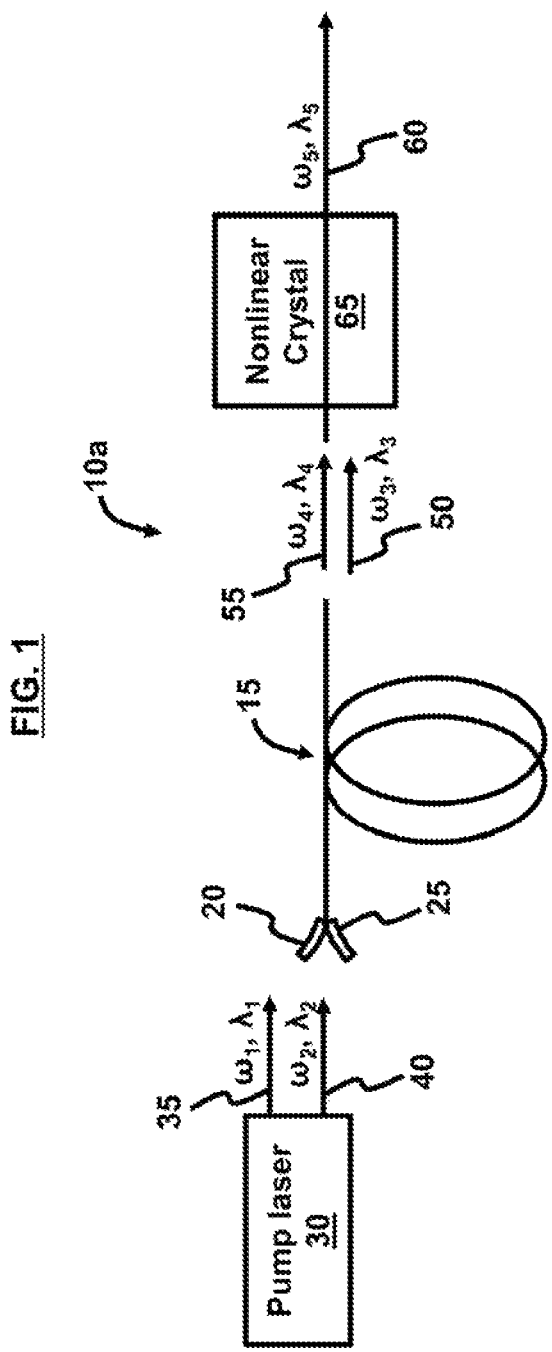

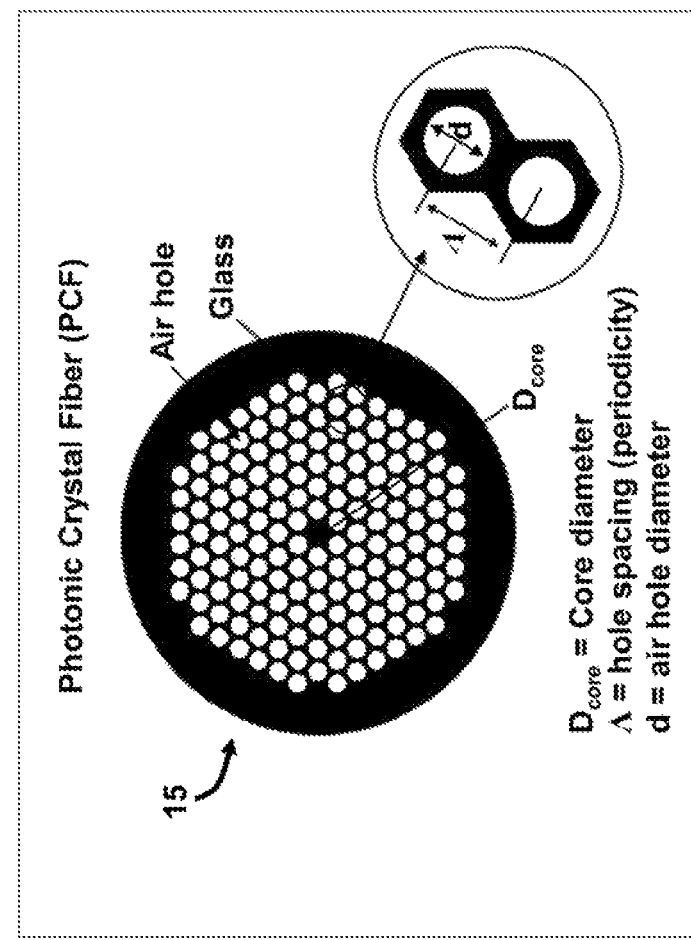

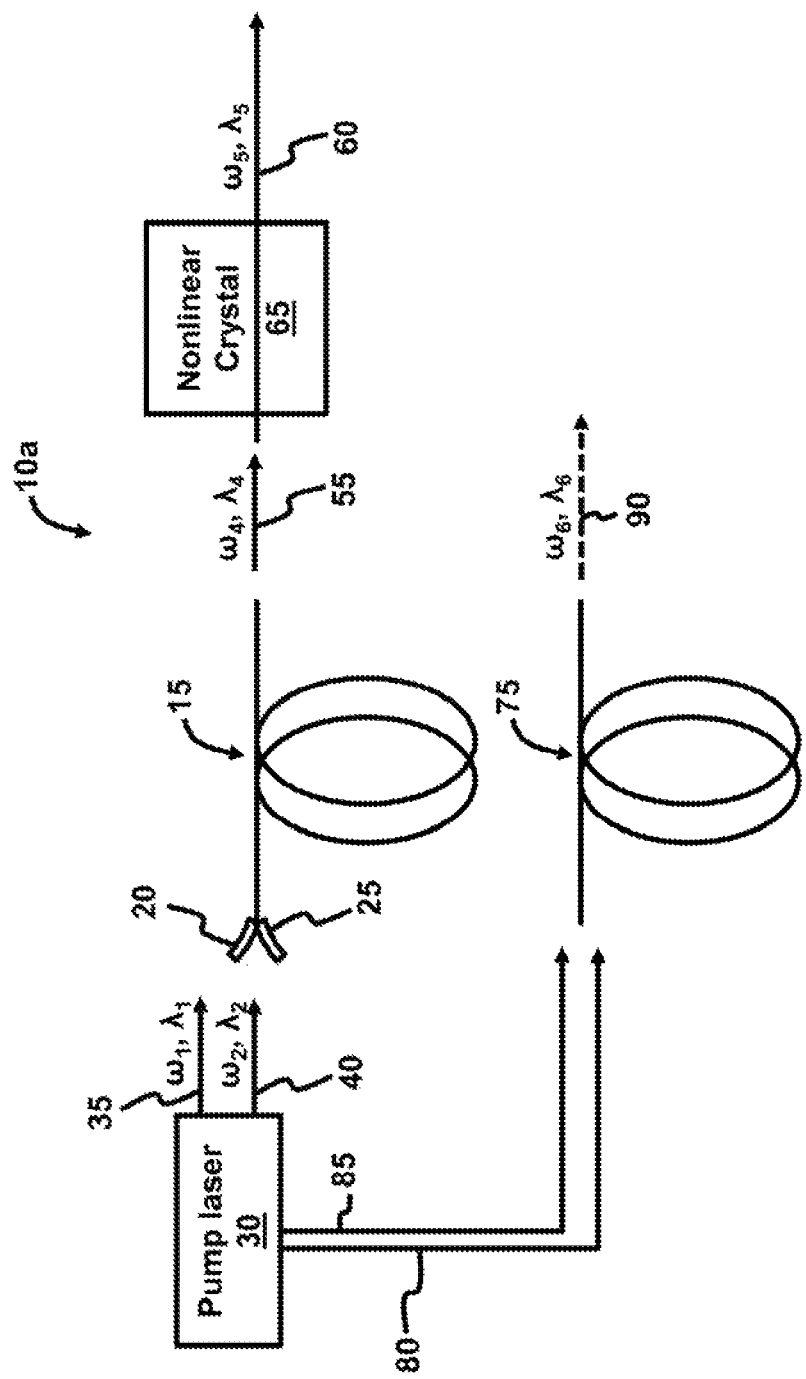

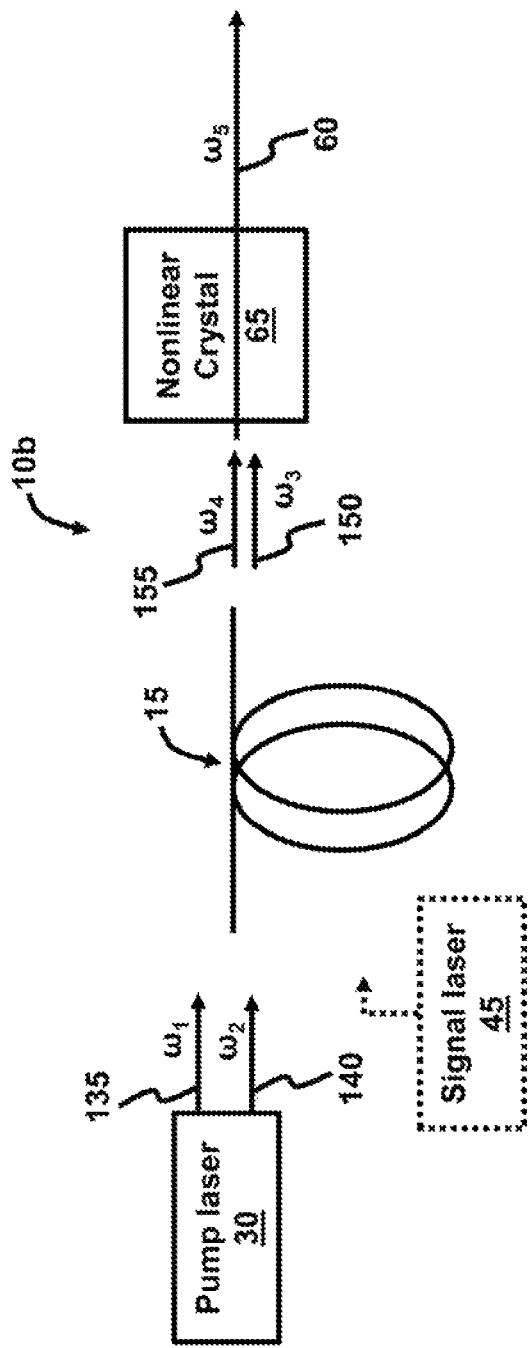

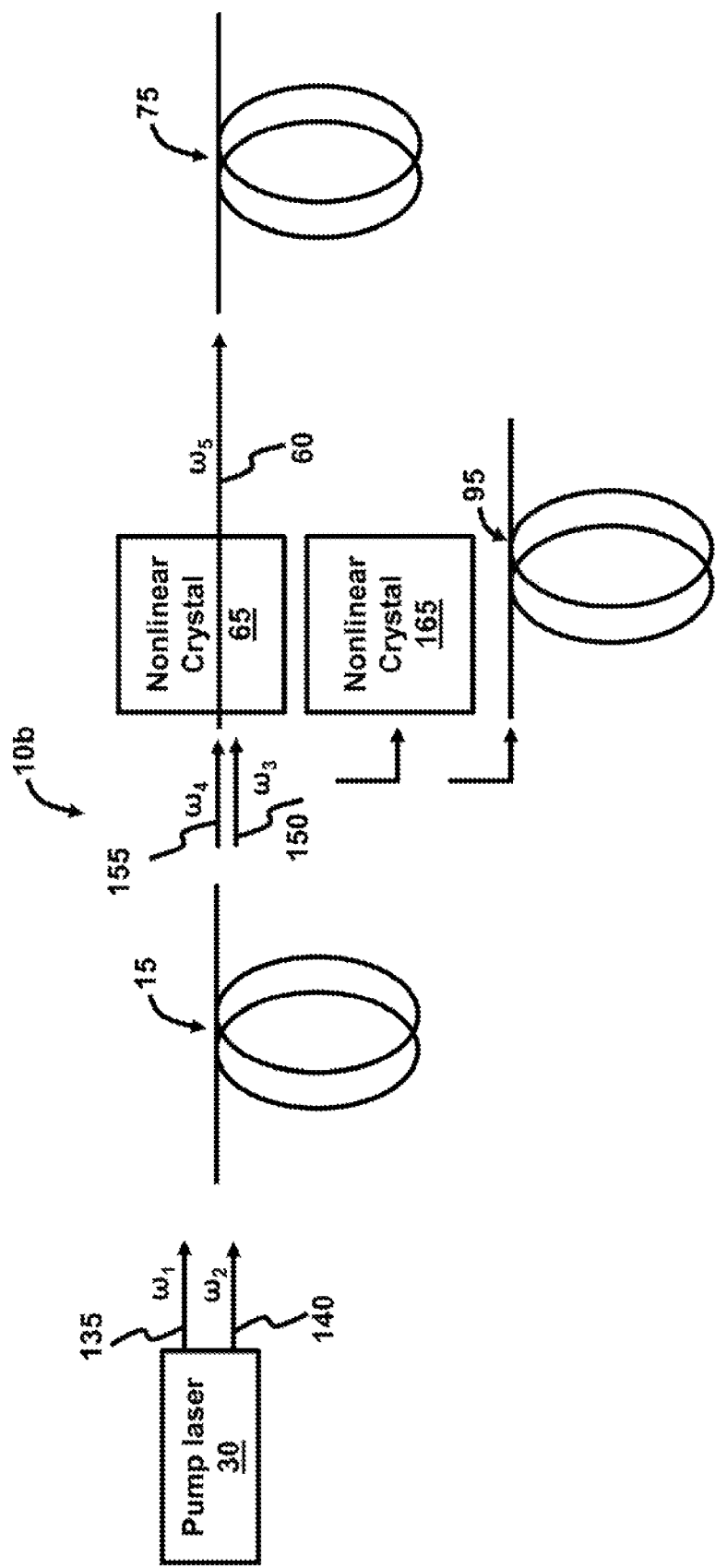

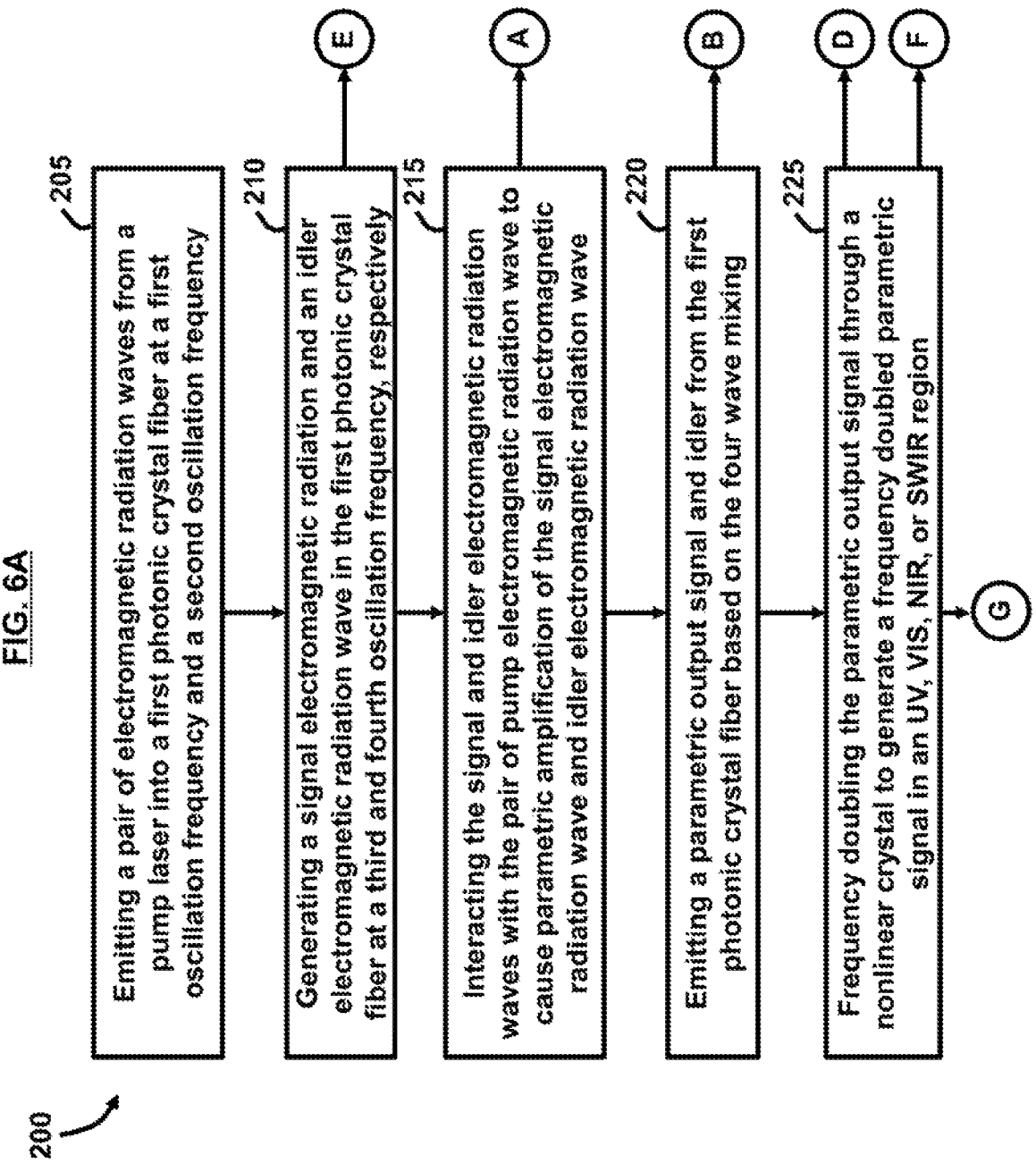

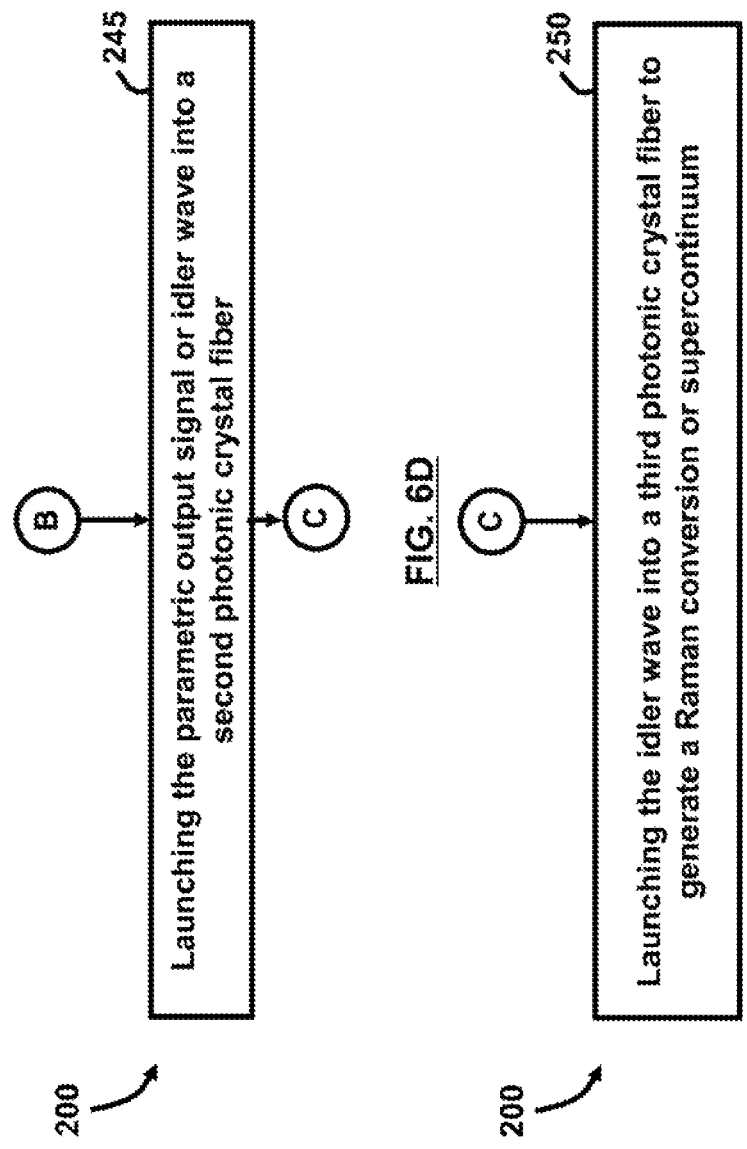

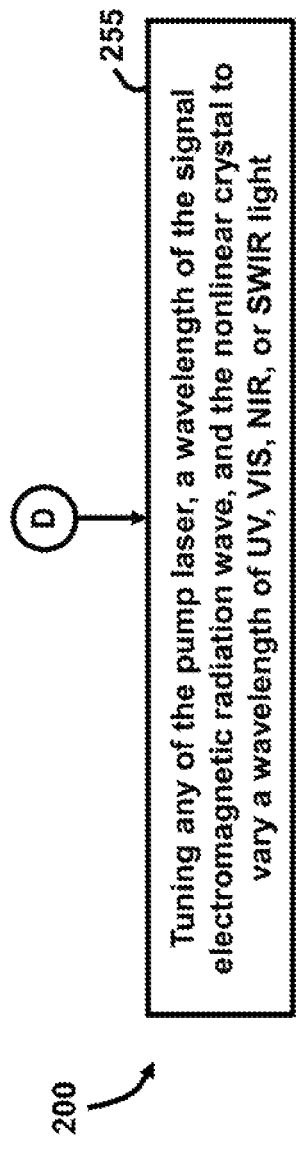
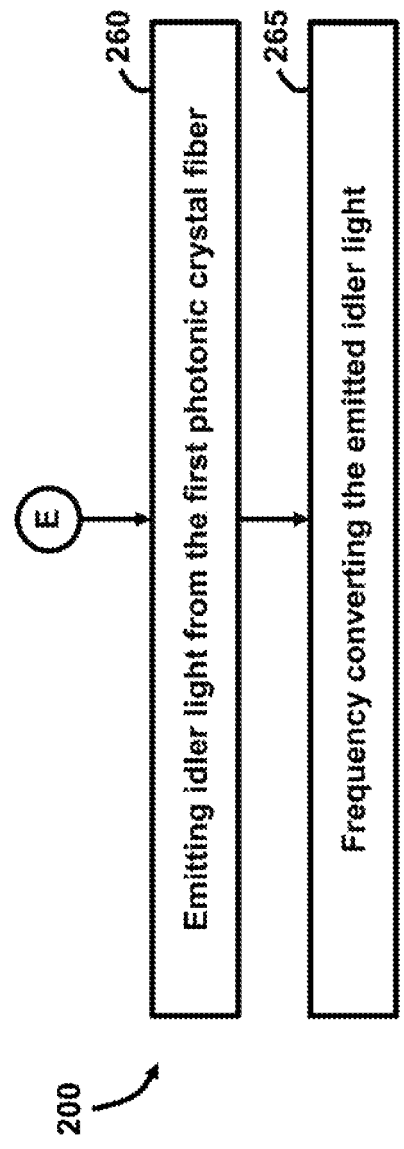

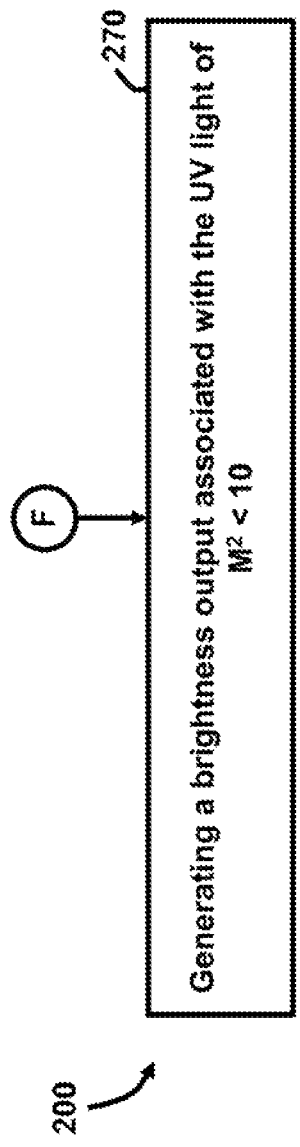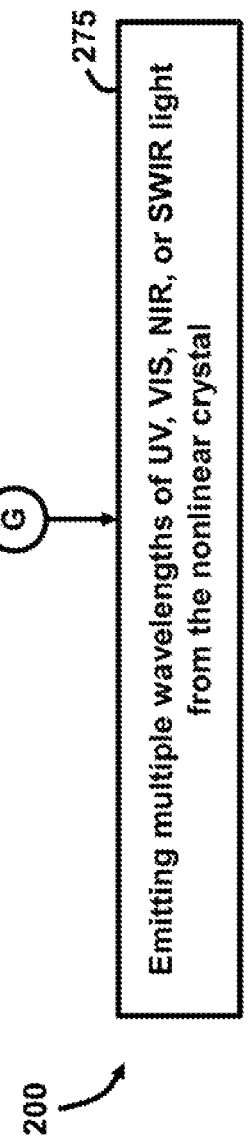

MULTI-WAVELENGTH SOURCES BASED ON PARAMETRIC AMPLIFICATION

CROSS REFERENCE TO RELATED APPLICATION

This application claims the benefit of U.S. Provisional Patent Application No. 62/765,283 filed on Aug. 20, 2018, the contents of which, in its entirety, is herein incorporated by reference.

GOVERNMENT INTEREST

The embodiments herein may be manufactured, used, and/or licensed by or for the United States Government without the payment of royalties thereon.

BACKGROUND

Technical Field

The embodiments herein generally relate to optical communication systems, and more particularly to optical amplification systems for achieving high brightness 1R sources.

Description of the Related Art

Parametric amplification in a glass optical fiber is a third order nonlinear process dependent upon $\chi^{(3)}$ of the glass. Parametric amplification operates by the process of four wave mixing, involving the interaction of four optical waves. In parametric amplification, one or two pump waves at frequency $\omega_1$ and $\omega_2$ amplifies a signal wave at frequency $\omega_3$ and generates an idler wave at frequency $\omega_4$. In the one pump, or degenerate, parametric processes, $\omega_1=\omega_2$. The frequencies of the signal and idler waves are related to the frequencies of the pump waves by the relation $\omega_1+\omega_2=\omega_3+\omega_4$. To achieve parametric amplification, phase matching between the pump, signal, and idler waves is required. The signal wave and/or idler wave to be amplified may be coupled into the fiber or parametrically generated spontaneously in the fiber through four wave mixing. Phase matching can be achieved by careful control of the dispersion of the fiber. Second harmonic generation, or frequency doubling in nonlinear crystals, is a second order nonlinear process in which two photons with the same frequency interacting with a nonlinear material generate new photons with twice the energy, and therefore twice the frequency and half the wavelength of the initial photons.

For industry, materials processing, biological sensing, and laser display technology for next generation projection theater also require laser sources at wavelengths not available in current laser sources. Of particular interest for industry is generation of sources in the UV and blue which is of interest in materials processing of copper and gold and blue lasers for display technology. Similarly, available laser sources do not always access the wavelength and wavebands of interest and needed for some commercial and military applications.

Some previous solutions for achieving high brightness infrared fiber parametric amplifiers and light sources are described in U.S. Pat. Nos. 9,570,873 and 9,577,401, the complete disclosures of which, in their entireties, are herein incorporated by reference. While the techniques described by these patents and others were sufficient for the purposes for which they were designed, there remains a need for a new technique to achieve high brightness, multi-wavelength sources over a broad wavelength region, particularly from the UV to SWIR wavelength regions.

SUMMARY

In view of the foregoing, an embodiment herein provides a system of parametric generation and amplification, the system comprising a photonic crystal fiber attached to a first coupler; a pump laser coupled to the first coupler, wherein the pump laser emits a first electromagnetic radiation wave into the photonic crystal fiber at a first oscillation frequency and a second electromagnetic radiation wave into the photonic crystal fiber at a second oscillation frequency, and wherein the first oscillation frequency equals the second oscillation frequency, wherein the first electromagnetic radiation wave and the second electromagnetic radiation wave in the photonic crystal fiber interact to generate a signal comprising an electromagnetic radiation wave at a third oscillation frequency and an idler comprising a fourth electromagnetic radiation wave at a fourth oscillation frequency to be generated and amplified through parametric amplification, wherein wave dispersion in the photonic crystal fiber causes a first wavelength of the first electromagnetic radiation wave, a second wavelength of the second electromagnetic radiation wave, a third wavelength of the third electromagnetic radiation wave, and a fourth wavelength of the fourth electromagnetic radiation wave to all be phase matched, wherein parametric amplification is achieved by four wave mixing, wherein the photonic crystal fiber emits a parametric output signal and idler based on the four wave mixing. The system further may comprise a nonlinear crystal to frequency double the parametric output signal or idler through second-harmonic generation.

The frequency doubled parametric signal or idler may be within an ultraviolet (UV) spectral region or visible (VIS) spectral region. The frequency doubled parametric signal or idler may be within a near-infrared (NIR) spectral region. The frequency doubled parametric signal or idler may be from an ultraviolet (UV) spectral region to a short-wave-infrared (SWIR) spectral region. The system may comprise a second photonic crystal fiber to receive electromagnetic radiation waves from the first photonic crystal laser to generate a second parametric output signal and idler. The photonic crystal fiber may comprise any of silica, fluoride, tellurite, and chalcogenide material. The nonlinear crystal may perform nth harmonic generation on the parametric output signal or idler.

Another embodiment provides a system of parametric amplification, the system comprising a photonic crystal fiber; a pump laser to emit a pair of electromagnetic radiation waves into the photonic crystal fiber at a first oscillation frequency and a second oscillation frequency, wherein the first oscillation frequency equals the second oscillation frequency; a signal laser to emit a signal electromagnetic radiation wave into the photonic crystal fiber at a third oscillation frequency, wherein the signal electromagnetic radiation wave interacts with the pair of electromagnetic radiation waves to cause parametric amplification of the signal electromagnetic radiation wave and generate an idler electromagnetic radiation wave, wherein wave dispersion in the photonic crystal fiber causes phase matching of the pair of electromagnetic radiation waves, the signal electromagnetic radiation wave, and the idler electromagnetic radiation wave, wherein parametric amplification is achieved by four wave mixing, and wherein the photonic crystal fiber emits a parametric output signal and idler based on the four wave mixing. The pump laser may comprise a Ytterbium (Yb) doped fiber laser with a linewidth<1 nm.

The system further may comprise a nonlinear crystal to frequency double the parametric output signal or idler through nth harmonic generation to generate an nth harmonic generation signal. The wavelength of the $n^{th}$ harmonic generation signal may be within an ultraviolet (UV) spectral region or visible (VIS) spectral region. The wavelength of the $n^{th}$ harmonic generation signal may be within an ultraviolet (UV) spectral region to a short-wave-infrared (SWIR) spectral region. The nonlinear crystal may comprise any of β-barium borate (BBO), lithium iodate ($LiIO_3$), potassium niobite ($KNbO_3$), monopotassium phosphate ($KH_2PO_4$, KDP), lithium triborate (LBO), gallium selenide (GaSe), potassium titanyl phosphate (KTP ($KTiOPO_4$)), lithium niobite ($LiNbO_3$), ammonium dihydrogen phosphate (ADP), and periodically poled stoichiometric lanthanum tantalate (PPSLT). A spectral linewidth of the signal laser may be <1 nm Another embodiment provides a method for amplifying an intensity of an optical signal, the method comprising emitting a pair of electromagnetic radiation waves from a pump laser into a first photonic crystal fiber at a first oscillation frequency and a second oscillation frequency, wherein the first oscillation frequency equals the second oscillation frequency; generating a signal electromagnetic radiation and an idler electromagnetic radiation wave in the first photonic crystal fiber at a third and fourth oscillation frequency, respectively; interacting the signal electromagnetic radiation wave with the pair of electromagnetic radiation waves to cause parametric amplification of the signal electromagnetic radiation wave and the idler electromagnetic radiation wave, wherein wave dispersion in the first photonic crystal fiber causes phase matching of the pair of electromagnetic radiation waves, the signal electromagnetic radiation wave, and the idler electromagnetic radiation wave, and wherein parametric amplification is achieved by four wave mixing; emitting a parametric output signal and idler from the first photonic crystal fiber based on the four wave mixing, and frequency doubling the parametric output signal through a nonlinear crystal to generate a frequency doubled parametric signal in an ultraviolet (UV), visible (VIS), near-infrared (NIR), or short-wave-infrared (SWIR) spectral region.

The method may further comprise generating a parametric idler, launching the parametric idler into a second nonlinear crystal phase matched to generate a second harmonic signal; and recycling the second harmonic signal or parametric idler into the pump laser. The method may further comprise launching the parametric output signal or idler wave into a second photonic crystal fiber. The method may further comprise launching the parametric output signal or idler electromagnetic radiation wave into a third photonic crystal fiber to generate a Raman conversion or supercontinuum.

The method may further comprise tuning any of the pump laser, a wavelength of the signal electromagnetic radiation wave, and the nonlinear crystal to vary a wavelength of UV, VIS, NIR, or SWIR light. The method may further comprise emitting idler light from the first photonic crystal fiber; and frequency converting the emitted idler light. The method may further comprise generating a brightness output associated with the UV light of $M^2<10$. The method may further comprise emitting multiple wavelengths of an UV. VIS, NIR, or SWIR light from the nonlinear crystal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. Further, the terms "a", "an", "first", "second", and "third" etc. used herein do not denote limitations of quantity, but rather denote the presence of one or more of the referenced items(s).

BRIEF DESCRIPTION OF THE DRAWINGS

The embodiments herein will be better understood from the following detailed description with reference to the drawings, in which:

FIG. 1 is a block diagram illustrating a system of parametric generation and amplification, according to an embodiment herein:

FIG. 2A is a schematic diagram illustrating an example photonic crystal fiber used in the system of FIG. 1, according to an embodiment herein;

FIG. 2B is a schematic diagram illustrating an example silica photonic crystal fiber used in the system of FIG. 1, according to an embodiment herein;

FIG. 3 is a block diagram illustrating the system of FIG. 1 with a second photonic crystal fiber, according to an embodiment herein;

FIG. 4 is a block diagram illustrating another system of parametric amplification, according to an embodiment herein;

FIG. 5 is a block diagram illustrating the system of FIG. 4 with additional photonic crystal fibers and nonlinear crystals, according to an embodiment herein;

FIG. 6A is a flow diagram illustrating a method for amplifying an intensity of an optical signal, according to an embodiment herein;

FIG. 6C is a flow diagram illustrating a method for launching a parametric output signal, according to an embodiment herein;

FIG. 6D is a flow diagram illustrating a method for launching an idler electromagnetic radiation wave, according to an embodiment herein;

FIG. 6E is a flow diagram illustrating a method for varying the wavelength of UV, VIS, NIR, or SWIR light, according to an embodiment herein;

FIG. 6F is a flow diagram illustrating a method for frequency converting emitted idler light, according to an embodiment herein;

FIG. 6O is a flow diagram illustrating a method for generating a brightness of UV, VIS, NIR, or SWIR light, according to an embodiment herein;

FIG. 6H is a flow diagram illustrating a method emitting multiple wavelengths of UV, VIS, NIR, or SWIR light, according to an embodiment herein;

DETAILED DESCRIPTION

Figure 6B:
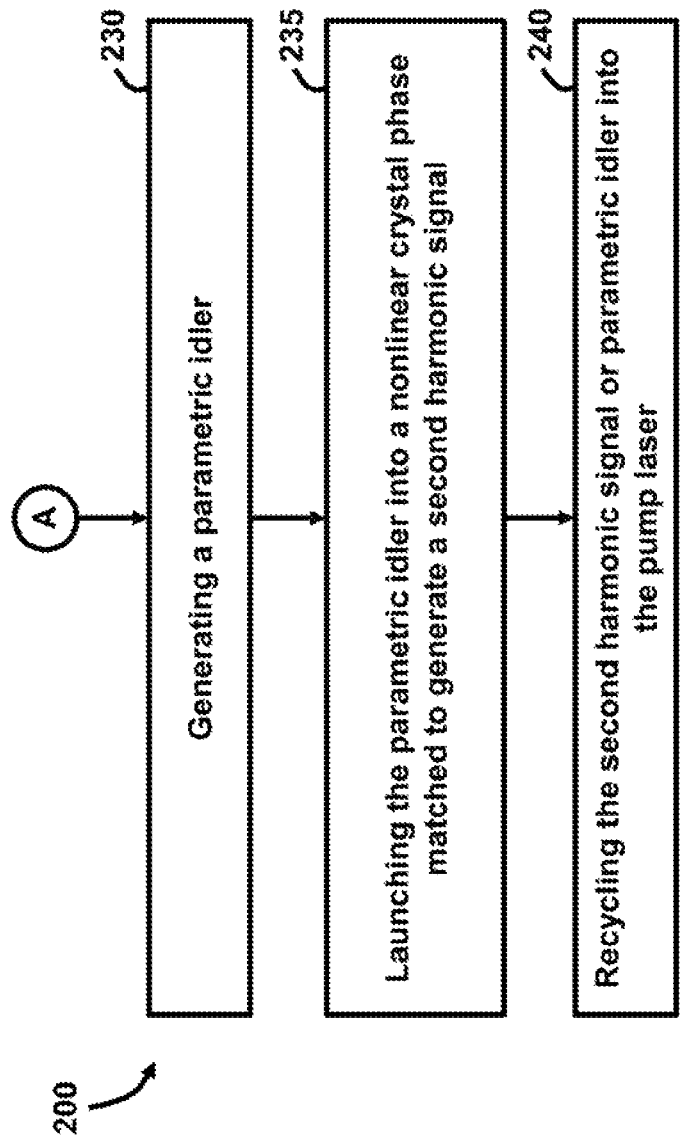
FIG. 6B is a flow diagram illustrating a method for recycling a second harmonic signal or idler into a pump laser, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides a system and method for achieving high brightness, multi-wavelength (two or greater simultaneous) and tunable sources over a broad wavelength region, from UV to Short Wave-IR (e.g., ~200 nm to ~2000 nm), using the processes of parametric amplification and second harmonic generation. The embodiments herein can enable compact lasers in the UV for a number of applications and can enable multiline lasers with tunability over the UV to SWIR wavelength regions. The wavelength agile sources provided by the embodiments herein allows access to these wavelengths. In addition, the tunable nature allows wavelength agility to enable one laser to accomplish multiple missions. Referring now to the drawings, and more particularly to FIGS. 1 through 8, where similar reference characters denote corresponding features consistently throughout the figures, there are shown exemplary embodiments.

High brightness sources are understood to be sources with high radiance, which is defined as the total power in the beam divided by the mode area of the beam at the beam waist and the solid angle of the divergence of the beam with typical units of $W \cdot sr^{-1} \cdot m^{-2}$. High brightness sources also have low $M^2$ numbers where $M^2$ is defined as a relationship between the half-angle beam divergence θ and the we is the beam radius at the minimum point (beam waist) for a given wavelength λ such that:

$$\theta = M^2 \frac{\lambda}{\pi w_0}$$

Here, "high brightness" is defined as power levels that are on the order of 1 W or higher with $M^2<10$. The conventional solutions for the generation of light in the wavelength range of interest generally fails to provide a way to generate high brightness light across the entire range with power levels on the order of 1 W. While certain wavelengths can be generated with high beam quality and Watt power levels, the embodiments herein provide a way to generate arbitrary wavelengths across this wavelength range and also multiple single wavelength sources from a single original laser source, all with power levels exceeding 1 W.

FIG. 1 illustrates a system 10a of parametric generation and amplification. The system 10a comprises a photonic crystal fiber 15 attached to a first coupler 20 and a second coupler 25. In an example, the photonic crystal fiber comprises a silica, solid core photonic crystal fiber with a core diameter between 2 μm and 25 μm. The photonic crystal fiber (PCF) 15 is an optical fiber whose guiding solid core region is surrounded by air holes. The air holes create a reduced index cladding which contains light in the solid core region. The advantage of photonic crystal fiber 15 over a conventional core/clad fiber is that the dispersion of the fiber can be more easily tailored by manipulating cladding microstructured hole size and periodicity as well as core size. In addition, very small core sizes are possible, resulting in increased nonlinearities in the photonic crystal fiber 15. A schematic of a photonic crystal fiber 15 is shown in FIG. 2A. Example methods of tuning the photonic crystal fiber 15 include: (1) During fabrication of the photonic crystal fiber 15, controlling, the size of a (solid glass) core, controlling the size of the cladding such as silica glass illustrated in FIG. 2A and/or the silica rods, controlling a geometrical arrangement, and controlling the hole size to pitch ratio of the photonic crystal fiber 15, having a pitch, which is radially varying, and/or (2) During exercising of the photonic crystal fiber 15 with pump laser waves and signal waves, changing the wavelength(s) of either and/or both a pump laser wave and/or a signal wave. Furthermore, maximization of nonlinear conversion of the photonic crystal fiber 15, and efficient parametric conversion with low peak power pulses or continuous wave laser sources, and minimization of power penalties are obtained, by the design of the photonic crystal fiber 15 and the choice of pump/signal waves, for example.

The photonic crystal fiber 15 may have a solid glass core, such as that formed by a plurality of glass rods surrounded by a plurality of air holes, where the solid glass and/or core has a distance Lambda (Λ) forming the pitch between each air hole in the plurality of air holes, and where each air hole, in the plurality of air holes, has a hole size d. Thus, in exemplary embodiments, at least one glass rod of the plurality of glass rods can be a core and/or core rod of the photonic crystal fiber 15 used in accordance with the embodiments herein.

In an exemplary embodiment, one of the ways the photonic crystal fiber 15 is tuned, during fabrication, includes controlling, the size of the solid glass core and/or core rod, and/or controlling the size of the cladding (such as the glass and/or the glass rods), by determining the geometrical arrangement of the hole (where such a geometrical arrangement can be a hexagonal configuration; i.e., a hex pack hole arrangement, and/or tuning can be accomplished by controlling the hole size to pitch ratio of the photonic crystal fiber 15, having the pitch which is radially varying, where the hole size divided by the distance forms the ratio of hole size to pitch.

In exemplary embodiments, other geometrical arrangements of holes are configured which are not based on a hex pack hole arrangement. Thus, in exemplary embodiments holes can be geometrically arranged in configurations of rings of holes as well as and/or hex pack hole arrangements and any combination of these and/or other geometrical arrangements of holes and hole size. In exemplary embodiments, other core/cladding compositions can be used extending beyond just the use of the photonic crystal fiber 15. Thus, in exemplary embodiments, some configurations include solid core/cladding used with specific fiber designs. In the first exemplary embodiment, the photonic crystal fiber 15 is formed by drawing glass rods and/or core rod and/or tubes through a fiber preform. Additionally, in the first exemplary embodiment, electromagnetic radiation waves can be launched into the photonic crystal fiber 15, as further described below, and additional tuning operations of one or more wavelengths of the one or more electromagnetic radiation waves can be performed in the photonic crystal fiber 15 to obtain and/or accomplish fiber optic amplification in a spectrum of infrared electromagnetic radiation.

Again with reference to FIG. 1, the system 10a comprises a pump laser 30 coupled to the first coupler 20, wherein the pump laser 30 emits (pumps) a first electromagnetic radiation wave 35 (i.e., an optical signal) into the photonic crystal fiber 15 at a first oscillation frequency $\omega_1$ and a second electromagnetic radiation wave 40 (i.e., an optical signal) into the photonic crystal fiber 15 at a second oscillation frequency $\omega_2$, and wherein the first oscillation frequency $\omega_1$ equals the second oscillation frequency $\omega_2$. The pump laser 30 may comprise a semiconductor laser light source or fiber laser, for example. The pump laser 30 is communicatively coupled to either the solid glass or core rod in the photonic crystal fiber 15 through the first coupler 20. In an example, the pump laser comprises a Ytterbium (Yb) doped fiber laser with a linewidth<1 nm.

The first electromagnetic radiation wave 35 and the second electromagnetic radiation wave 40 interact in the photonic crystal fiber 15 to generate a third electromagnetic radiation wave (signal) 50 and a fourth electromagnetic radiation (idler) wave 55 through four wave mixing whereby the first electromagnetic wave and second electromagnetic wave amplify the third electromagnetic wave and fourth electromagnetic wave by parametric amplification (e.g., due to nonlinearities in the transmission medium).

Wave dispersion in the photonic crystal fiber 15 causes a first wavelength $\lambda_1$ of the first electromagnetic radiation wave 35, a second wavelength $\lambda_2$ of the second electromagnetic radiation wave 40, a third wavelength $\lambda_3$ of the third electromagnetic radiation wave 50, and a fourth wavelength $\lambda_4$ of the fourth electromagnetic radiation wave 55 to all be phase matched. The photonic crystal fiber 15 has a dispersion profile and the dispersion profile causes a first wavelength $\lambda_1$ of the first electromagnetic radiation wave 35 and a second wavelength $\lambda_2$ of the second electromagnetic radiation wave 40, a third wavelength $\lambda_3$ of the third electromagnetic radiation wave 50, and the fourth wavelength $\lambda_4$ of the fourth electromagnetic radiation wave 55 to be phase matched (i.e., which is characterized by $k_3+k_4-k_1-k_2 \sim 0$.

Parametric generation and amplification is achieved by four wave mixing. The photonic crystal fiber 15 emits a parametric output signal 60 based on the four wave mixing, and the parametric output signal 60. The system 10a further may comprise a nonlinear crystal 65 to frequency double the parametric output signal 60 through second-harmonic generation. The frequency doubled output comprises a fifth oscillation frequency $\omega_5$ that is one quarter the first wavelength $\lambda_1$ and one half the third wavelength $\lambda_3$. The nonlinear crystal 54 may be an optical crystal comprising various types of SHG materials, such as, for example: β-barium borate (BBO), lithium iodate ($LiIO_3$), potassium niobite ($KNbO_3$), monopotassium phosphate ($KH_2PO_4$, KDP), lithium triborate (LBO), gallium selenide (GaSe), potassium titanyl phosphate (KTP ($KTiOPO_4$)), lithium niobite ($LiNbO_3$), ammonium dihydrogen phosphate (ADP), and periodically poled stoichiometric lanthanum tantalate (PPSLT), for example.

Four wave mixing is used in telecom typically to amplify near and around a certain pump wavelength; that is the signal and idler are typically within 100 nm of the pump wavelength. In the embodiments herein, four wave mixing sources are provided where the signal and/or idler can be >100 nm from the pump wavelength. The generation of high power (defined as 1 W or greater) conversion of light through four wave mixing in the optical photonic crystal fiber 15 requires controlling multiple nonlinear processes that compete, such as Raman and self-phase modulation. Efficient conversion through four wave mixing requires that the multiple generated waves propagate at the same speed inside the photonic crystal fiber 15 and have a large spatial overlap between modes, where large spatial overlap is understood to be above 50%. Both of these conditions can be satisfied in the photonic crystal fiber 15. The use of the photonic crystal fiber 15 allows for the zero dispersion point to be moved away from the value imposed by the fiber material. To achieve wavelengths not accessible by parametric amplification, the parametric output signal 60 is frequency doubled through the process of second harmonic generation by the nonlinear crystal 65 to achieve the desired wavelengths below the parametric wavelengths.

Previously, in the industry, parametric amplification has been demonstrated previously in fiber, however previously, the shortest wavelength accessible has been $>\frac{1}{2}$ the wavelength of the pump laser. Due to fiber inhomogeneities and competing nonlinear processes, line broadening of the parametric output typically occurred. In was not obvious to researchers in the industry that this output could be frequency doubled by nonlinear crystals.

The embodiments herein addresses common failures in generating high power light, where instead of using long lengths of fiber (20 m or more) to increase the four wave mixing efficiency, the system 10a utilizes high peak power (1 kW to 1 MW) or high average power (1 W to 1 kW) to convert the light in a short photonic crystal fiber 15 (0.1 to 20 m). By controlling the length of the photonic crystal fiber 15 and the fiber configuration (i.e., dispersion of the fiber and mode overlaps), the use of a high peak power laser propagating does not broaden into a supercontinuum but instead, converts the power from the pump into the signal and idler waves. The threshold for four wave mixing can be reduced below the threshold for Raman conversion, ensuring only the relevant as-designed idler and signal wavelengths can be generated. Example pump wavelengths are within the range of 0.9 to 1.2 µm, and more specifically in the range of 1.02 to 1.16 µm. An example embodiment has a polarized pump laser and a polarization maintaining (PM) photonic crystal fiber 15, however unpolarized lasers and non-PM fiber can be used in accordance with the embodiments herein.

Example conversion efficiencies in the nonlinear crystal 65 are between approximately 20% and approximately 90%, depending on the input laser power. The embodiments herein simplify the range of crystals that can be used by generating high peak power laser pulses with high average power, thereby reducing the length of the crystal required and increasing the efficiency of conversion through the nonlinear crystal 65. The nonlinear crystal 65 is defined by the wavelength of range of the system 10a but may be LBO and BBO, KTP, PPSLT, and PPLN for generation of UV to visible wavelengths. These and other nonlinear crystals such as ZGP, OP—GaN, or Op-GaP may be used for other wavelength ranges.

According to the system 10a, parametric sources comprising of a silica photonic crystal fiber 15 pumped by laser 30 at frequency $\omega_1$ and frequency $\omega_2$ (where $\omega_1=\omega_2$). The pump laser 30 is launched into the core of the photonic crystal fiber 15 at an input end of the photonic crystal fiber 15 by a coupling mechanism; e.g., first coupler 20. A signal at frequency $\omega_3$ and idler wave 55 at frequency $\omega_4$ is spontaneously generated in the core of the photonic crystal fiber 15 by four wave mixing and these waves are then amplified by the pump as they transmit through the photonic crystal fiber 15. The pump(s), signal, and idler are transmitted in the photonic crystal fiber 15 and interact. The pumps amplify the signal and idler wave 55 at frequency $\omega_4$. The dispersion of the photonic crystal fiber 15 is configured so that the pump signal and idler waves 55 are phase matched; that is $k_3+k_4-k_1-k_2 \sim 0$.

The frequency doubled parametric signal may be within an ultraviolet (UV) spectral region, in an example. The frequency doubled parametric signal or idler may be within a near-infrared (NIR) or visible (VIS) spectral region, in another example. The frequency doubled parametric signal or idler may be from an ultraviolet (UV) spectral region to a short-wave-infrared (SWIR) spectral region, according to an example.

As shown in FIG. 3, with reference to FIGS. 1 and 2, the system 10a may comprise a second photonic crystal fiber 75 to receive a pair of electromagnetic radiation waves 80, 85 from the pump laser 30 to generate a second parametric output signal 90 (at frequency $\omega_6$ and wavelength $\lambda_6$), which may (but does not necessarily have to) combine with the first parametric output signal 60. According to some examples, the photonic crystal fiber 15 may comprise any of silica, fluoride, tellurite, and chalcogenide material. The nonlinear crystal 65 may perform $n^{th}$ harmonic generation on the parametric output signal 60.

FIG. 4, with reference to FIGS. 1 through 3, illustrates another system 10b of parametric amplification according to the embodiments herein. The system 10b comprises a photonic crystal fiber 15; a pump laser 30 to emit (pump) a pair of electromagnetic radiation waves 135, 140 (e.g., optical signal) into the photonic crystal fiber 15 at a first oscillation frequency $\omega_1$ and a second oscillation frequency $\omega_2$, respectively.

The first oscillation frequency $\omega_1$ equals the second oscillation frequency $\omega_2$. A signal electromagnetic radiation wave 150 at a third oscillation frequency $\omega_3$ and idler electromagnetic wave 155 are generated in the photonic crystal fiber 15, wherein the signal electromagnetic radiation wave 150 and idler electromagnetic radiation wave 155 interacts with the pair of electromagnetic radiation waves 135, 140 to cause parametric amplification of the signal electromagnetic radiation wave 150 and idler electromagnetic radiation wave 155. In an example embodiment, a signal laser 45 may emit a signal electromagnetic radiation wave 150 into the photonic crystal fiber 15 at a third oscillation frequency $\omega_3$. The spectral linewidth of the signal laser may be <1 nm.

Wave dispersion in the photonic crystal fiber 15 causes phase matching of the pair of electromagnetic radiation waves 135, 140, the signal electromagnetic radiation wave 150, and the idler electromagnetic radiation wave 155. Parametric amplification is achieved by four wave mixing. The photonic crystal fiber 15 emits a parametric output signal 60 based on the four wave mixing. The system 10b further comprises a nonlinear crystal 65 to frequency double the signal electromagnetic radiation wave 150 through $n^{th}$ harmonic generation to generate an $n^{th}$ harmonic generation signal. The frequency doubled parametric output signal 60 comprises an oscillation frequency $\omega_5$ that is one quarter the first oscillation frequency $\omega_1$ and one half the third oscillation frequency $\omega_3$. In an example, the nonlinear crystal 65 may comprise barium borate. In another example, the nonlinear crystal 65 may comprise periodically poled lithium niobate. According to an example, the wavelength of the $n^{th}$ harmonic generation signal may be within an ultraviolet (UV) spectral region or visible (VIS) spectral region. According to another example, the wavelength of the $n^{th}$ harmonic generation signal may be in the ultraviolet (UV) spectral region to a short-wave-infrared (IR) spectral region. FIG. 5, with reference to FIGS. 1 through 4, illustrates other aspects of the system 10b, which are further described with reference to the method 200 provided in FIGS. 6A through 6H and as further described below.

FIGS. 6A through 6H, with reference to FIGS. 1 through 5, is a flowchart illustrating a method 200 for amplifying an intensity of an optical signal. As shown in FIG. 6A, the method 200 comprises emitting (205) a pair of electromagnetic radiation waves 135, 140 from a pump laser 30 into a first photonic crystal fiber 15 at a first oscillation frequency $\omega_1$ and a second oscillation frequency $\omega_2$, wherein the first oscillation frequency $\omega_1$ equals the second oscillation frequency $\omega_2$; generating (210) a signal electromagnetic radiation wave 150 and an idler electromagnetic radiation wave 155 in the first photonic crystal fiber 15 at a third $\omega_3$ and fourth $\omega_4$ oscillation frequency, respectively; interacting (215) the signal electromagnetic radiation wave 150 and idler electromagnetic radiation wave 155 with the pair of electromagnetic radiation waves 135, 140 to cause parametric amplification of the signal electromagnetic radiation wave 150 and idler electromagnetic radiation wave 155, wherein wave dispersion in the first photonic crystal fiber 15 causes phase matching of the pair of electromagnetic radiation waves 135, 140, the signal electromagnetic radiation wave 150, and the idler electromagnetic radiation wave 155, and wherein parametric amplification is achieved by four wave mixing; emitting (220) a parametric output signal (e.g., wave 150) and idler (e.g., wave 155) from the first photonic crystal fiber 15 based on the four wave mixing; and frequency doubling (225) the parametric output signal (e.g., wave 150) through a nonlinear crystal 65 to generate a frequency doubled parametric signal 60 in an ultraviolet (UV), visible (VIS), near-infrared (NIR), or short-wave-infrared (SWIR) spectral region.

The method 200 can be used for both continuous wave (CW) or pulsed light sources. The method 200 also simplifies the architecture of any system developed based on the embodiments herein, as there is no need for a resonant cavity to be formed within the photonic crystal fiber 15 or around the second harmonic conversion element. Example implementations require only a single pass through the fiber and crystal.

In an example, the silica photonic crystal fiber 15 is configured such that the parametric output signal (e.g., wave 150) frequency is half of the desired UV frequency. The signal at frequency $\omega_3$ from the parametric fiber source is coupled into the nonlinear crystal 65, which is phase matched for second harmonic generation to convert the signal at frequency $\omega_3$ to a frequency $\omega_5$ where $\omega_5=2\times\omega_3$ and $\omega_5$ is a frequency within the UV spectral region.

In another example, the parametric output signal (e.g., wave 150) can be at frequencies within the visible to near-IR spectral region. In another example, the parametric output signal (e.g., wave 150) as well as the idler wave 155 and/or residual pump can be frequency doubled through second harmonic generation (SHG) in the nonlinear crystal 65 to generate multiline sources from the UV to the short-wave-IR. In another example, the source can be tunable by tuning the pump wavelength as well as tuning the nonlinear crystal 65 to enable phase matching at the new signal, idler, and/or residual pump wavelengths to allow second harmonic generation of these new wavelengths. In another example, the source can pump another photonic crystal fiber 75 to generate another nonlinear process such as Raman conversion or supercontinuum to expand the wavelength further, as shown in FIG. 5.

As shown in FIG. 6B, the method 200 may further comprise generating (230) a parametric idler, launching (235) the parametric idler into a second nonlinear crystal 165 (as shown in FIG. 5) phase matched to generate a second harmonic signal; and recycling (240) the second harmonic signal or parametric idler into the pump laser 30. As shown in FIG. 6C, the method 200 may further comprise launching (245) the parametric output signal 60 or idler wave 155 into a second photonic crystal fiber 75 (as shown in FIG. 5). As shown in FIG. 6D, the method 200 may further comprise launching (250) the parametric output signal (e.g., wave 150) or the idler electromagnetic radiation wave 155 into a third photonic crystal fiber 95 (as shown in FIG. 5) to generate a Raman conversion or supercontinuum of around 2.0 μm, in one non-limiting example; although other amounts are possible.

As shown in FIG. 6E, the method 200 may further comprise tuning (255) any of the pump laser 30, a wavelength of the signal electromagnetic radiation wave 150, and the nonlinear crystal 65 to vary a wavelength of UV, VIS, NIR, or SWIR light. As shown in FIG. 6F, the method 200 may further comprise emitting (260) idler light from the first photonic crystal fiber 15; and frequency converting (265) the emitted idler light. As shown in FIG. 6G, the method 200 may further comprise generating (270) a brightness output associated with the UV light of $M^2<10$. As shown in FIG. 6H, the method 200 may further comprise emitting (275) multiple wavelengths of UV, VIS, NIR, or SWIR light from the nonlinear crystal 65.

The following examples describe techniques of practicing the embodiments herein. While the examples describe specific implementations, configurations, materials, sizes, etc. the embodiments herein are not restricted to these particular parameters. Accordingly, other parameters may be used and implemented in accordance with the embodiments herein.

Example 1

Figure 7:
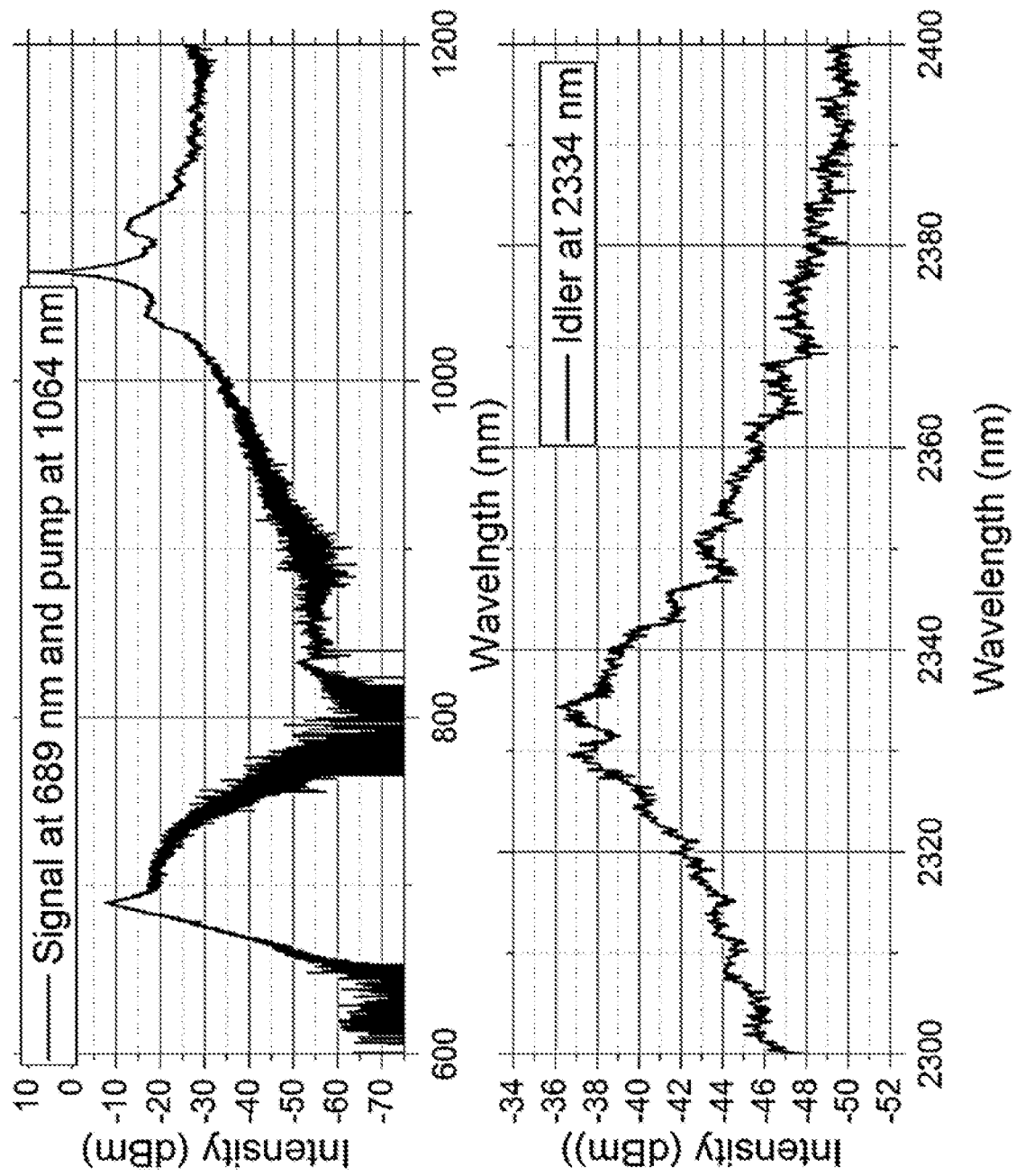
FIG. 7 are graphical diagrams illustrating the generated parametric signal and idler for an input pump at 1.064 μm from the silica PCF of FIG. 2B, according to an embodiment herein.
Figure 8:
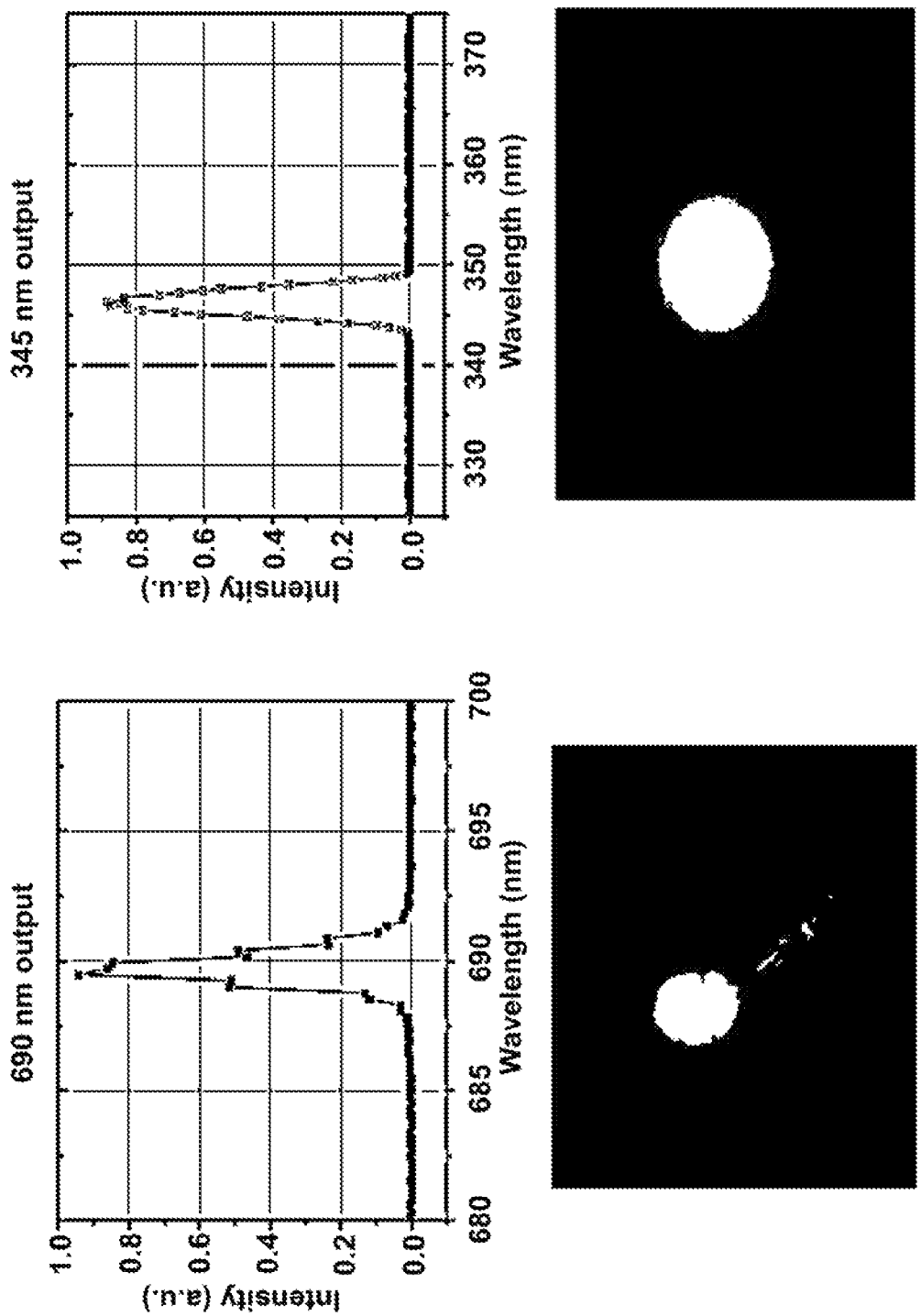
FIG. 8 are graphical diagrams illustrating the second harmonic at a UV region and a VIS or NIR regions, according to an embodiment herein.

A 1.064 μm laser is launched into a photonic crystal fiber with parameters nominally: pitch, $\Lambda=5.16$ μm, hole diameter, $d=2.32$ μm and ratio $d/\Lambda=0.45$ to phase match the signal, idler, and pump to generate a signal at wavelength 690 nm, and an idler at wavelength 2.3 μm in the short wave IR through parametric amplification. The cross-section of the silica photonic crystal fiber is shown in FIG. 2B. The pump and generated signal and idler are shown in FIG. 7. The generated signal is launched into a barium borate crystal, angle-cut to phase match the SHG of the 690 nm signal wavelength. The generated SHG signal is at 345 nm. The input parametric signal and the generated SHG are shown in FIG. 8.

Example 2

A 1.08 μm laser is launched into a photonic crystal fiber with parameters nominally: pitch, $\Lambda=5.16$ μm, hole diameter, $d=2.32$ μm and ratio $d/\Lambda=0.45$ to phase match the signal, idler, and pump to generate a signal at wavelength 690 nm, and an idler at wavelength 2.3 μm in the short wave IR through parametric amplification. The cross-section of the silica photonic crystal fiber is shown in FIG. 2B. The pump and generated signal and idler are shown in FIG. 7. The generated signal is launched into a barium borate crystal, angle-cut to phase match the SHG of the 690 nm signal wavelength. The generated SHG signal is at 345 nm. The input parametric signal and the generated SHG are shown in FIG. 8.

Example 3

A 1.064 μm laser pumped by 976 nm light is launched into a photonic crystal fiber with parameters designed to phase match the signal, idler, and pump to generate a signal at wavelength 730 nm, and an idler at wavelength 1.95 μm through parametric amplification. The parametric signal at 730 nm is launched into a nonlinear crystal phase matched to generate the second harmonic at 365 nm. The generated parametric idler is launched into a nonlinear crystal phase matched to generate a second harmonic idler at 976 nm. The generated 976 nm may be recycled and used to pump the 1.064 μm laser to increase optical efficiency of the system.

Example 4

A 1.064 μm laser is launched into a photonic crystal fiber with parameters designed to phase match the signal, idler, and pump to generate a signal at wavelength 870 nm, and an idler at wavelength around 1.37 μm through parametric amplification. The parametric signal at 870 nm is launched into a nonlinear crystal phase matched to generate the second harmonic at 435 nm. The generated parametric idler is launched into a nonlinear crystal phase matched to generate a second harmonic idler at 685 μm. The residual pump is launched into a nonlinear crystal phase matched to generate the second harmonic at 532 nm. The resultant red (685 nm light), green (532 nm light), and blue (435 nm light) is used for a RGB laser-based display system.

Example 5

The 1.064 μm laser in Example 3 is tuned to 1.08 μm. The phase matched signal and idler wavelengths become 900 nm and 1.35 μm, respectively. Periodically poled lithium niobite (PPLN) is used as the nonlinear SHG crystals. The PPLN temperature is tuned to phase match SHG at the new wavelengths to generate 450 nm for the parametric signal input, 675 nm for the parametric idler input, and 540 nm for the residual pump.

Example 6

A 1.08 μm laser is launched into a photonic crystal fiber with parameters nominally: pitch, $\Lambda=5.16$ μm, hole diameter, $d=2.32$ μm and ratio $d/\Lambda=0.45$ to phase match the signal, idler, and pump to generate a signal at wavelength 690 nm, and an idler at wavelength 2.3 μm in the short wave IR through parametric amplification. The signal wavelength at 690 nm is launched into a second photonic crystal fiber designed such that the dispersion is such that 690 nm is near zero and in the anomalous dispersion region to generate a supercontinuum around 690 nm. The idler, in turn, can be launched into a third photonic crystal fiber designed such that the dispersion is such that 690 nm is near zero and in the anomalous dispersion region to generate a supercontinuum around 2.3 μm and extending into the MWIR (~2-5 μm) or LWIR (~5-12+ μm).

In addition to the examples described above, the embodiments herein may be implemented in various alternative configurations. For example, multiple SHG wavelength stages may be used to extend the wavelength range. Also, third harmonic, fourth harmonic, and $n^{th}$ harmonic generation may used to extend the wavelength range. Moreover, sum frequency generation (SFG) can be used where two waves are mixed and a third wave is generated where $\omega_1+\omega_2=\omega_3$ and the nonlinear frequency generation process where $\omega_1$, $\omega_2$, and $\omega_3$ can be either the pump, signal, or idler wavelengths. Additionally, difference frequency generation (DFG) can be used where two waves are mixed and a third wave is generated where $\omega_1-\omega_2=\omega_3$ and the nonlinear frequency generation process where $\omega_1$, $\omega_2$, and $\omega_3$ can be either the pump, signal, or idler wavelengths. Furthermore, alternate fiber materials such as fluoride fiber (ZBLAN, InF), tellurite fiber, or chalcogenide fiber can be used as the PCF material to extend the operating wavelength region to enable multiline sources from the UV to the LWIR. In other configurations, multiple parametric stages can be used to extend the wavelength region. The signal and/or idler can be used as the pump for a second parametric stage to generate new signal and idler signals, which can be frequency converted in a nonlinear crystal. Additionally, multiple parametric stages coupled with SHG stages can be used to extend the operating wavelength region further. Moreover, one or more parametric stages can be used with other nonlinear stages (e.g., Raman conversion stages, supercontinuum stages, SHG stages, DFG stages, etc.) to extend the operating wavelength regions and/or operating bandwidth further.

The embodiments herein provide a system and method for achieving high brightness sources in the ultraviolet (UV) wavelength region from 200 nm to 400 nm. More generally, the embodiments herein provide a system and method for achieving multi-wavelength sources over a broad wavelength region, from UV to Short Wave-IR (SWIR). A method involves using high nonlinearity silica photonic crystal fibers (PCF) 15 to generate light by parametric mixing. By controlling the core size, cladding hole size, and pitch of the PCF, the dispersion of the fiber can be tailored to achieve phase matching over the pump, signal, and idler laser wavelengths to maximize the nonlinear conversion. The emitted light signal from the parametric process is then frequency doubled using nonlinear second harmonic generation (SHG) to produce UV light. This generated UV wavelength can be varied by tuning of either the pump or the signal wavelength in the parametric amplification process and by tuning the nonlinear crystal to phase match the SHG process. The emitted idler light from the parametric process may or may not be frequency converted, depending upon desired wavelengths. Applications of such sources include LIDAR, chemical and biological sensing, projection display technology, laser light show technology, illumination sources, multi-wavelength material processing, and medical applications, among others.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system of parametric generation and amplification, the system comprising:
    a first photonic crystal fiber attached to a first coupler, said first photonic crystal fiber comprising one of silica, fluoride, and tellurite;
    a pump laser coupled to the first coupler, wherein the pump laser emits a first electromagnetic radiation wave into the first photonic crystal fiber at a first oscillation frequency and a second electromagnetic radiation wave into the first photonic crystal fiber at a second oscillation frequency, and wherein the first oscillation frequency equals the second oscillation frequency, wherein the first electromagnetic radiation wave and the second electromagnetic radiation wave in the first photonic crystal fiber interact to parametrically generate through four wave mixing a third electromagnetic radiation wave at a third oscillation frequency and a fourth electromagnetic radiation wave at a fourth oscillation frequency and amplified through parametric amplification,
    wherein wave dispersion in the first photonic crystal fiber causes a first wavelength of the first electromagnetic radiation wave, a second wavelength of the second electromagnetic radiation wave, a third wavelength of the third electromagnetic radiation wave, and a fourth wavelength of the fourth electromagnetic radiation wave to all be phase matched, wherein parametric generation and amplification is achieved by four wave mixing, wherein the first photonic crystal fiber emits the third electromagnetic radiation wave and the fourth electromagnetic radiation wave based on the four wave mixing;
    at least one nonlinear crystal to frequency double at least one of the third electromagnetic radiation wave and the fourth electromagnetic radiation wave through second-harmonic generation,
    wherein at least one of the frequency doubled third electromagnetic radiation wave and the frequency doubled fourth electromagnetic radiation wave is within an ultraviolet (UV) spectral region to a visible (VIS) spectral region,
    wherein said at least one nonlinear crystal comprises:
    a nonlinear crystal phase matched to the third electromagnetic radiation wave,
    a nonlinear crystal phase matched to the fourth electromagnetic radiation wave, and
    a nonlinear crystal phase matched to the first electromagnetic radiation wave and the second electromagnetic radiation wave,
    wherein the third electromagnetic radiation wave is frequency doubled through second harmonic generation in said nonlinear crystal phase matched to the third electromagnetic radiation wave, the frequency doubled third electromagnetic radiation wave being in the visible spectral range,
    wherein the fourth electromagnetic radiation wave is frequency doubled through second harmonic generation in said nonlinear crystal phase matched to the fourth electromagnetic radiation wave, the frequency doubled fourth electromagnetic radiation wave being in the visible spectral range,
    wherein the first electromagnetic radiation wave and the second electromagnetic radiation wave are frequency doubled through second harmonic generation in said nonlinear crystal phase matched to the first electromagnetic radiation wave and the second electromagnetic radiation wave, the frequency doubled first electromagnetic radiation wave and the frequency doubled second electromagnetic radiation wave being in the visible spectral range.

2. The system of claim 1, wherein the pump laser comprises a Ytterbium (Yb) doped fiber laser with a linewidth<1 nm.

3. The system of claim 1, comprising a second photonic crystal fiber to receive electromagnetic radiation waves from the first photonic crystal fiber to generate another parametric output signal and another idler.

4. The system of claim 1, wherein the first photonic crystal fiber comprises a silica, solid core photonic crystal fiber comprising a core diameter between 2 μm and 25 μm.

5. The system of claim 1, wherein the at least one nonlinear crystal comprises any of β-barium borate (BBO), lithium iodate ($LiIO_3$), potassium niobate ($KNbO_3$), monopotassium phosphate ($KH_2PO_4$, KDP), lithium triborate (LBO), gallium selenide (GaSe), potassium titanyl phosphate ($KTiOPO_4$, KTP), lithium niobate ($LiNbO_3$), ammonium dihydrogen phosphate (ADP), and periodically poled stoichiometric lanthanum tantalate (PPSLT).

6. A method for generating and amplifying an intensity of an optical signal, the method comprising:
 emitting a first electromagnetic radiation wave and a second electromagnetic radiation wave from a pump laser into a first photonic crystal fiber at a first oscillation frequency and a second oscillation frequency, wherein the first oscillation frequency equals the second oscillation frequency, the first photonic crystal fiber comprising one of silica, fluoride, and tellurite;
 generating a third electromagnetic radiation wave and fourth electromagnetic radiation wave in the first photonic crystal fiber at a third and fourth oscillation frequency, respectively, wherein said generating a third electromagnetic radiation wave and fourth electromagnetic radiation wave comprises tuning the pump laser and the nonlinear crystal to vary a third electromagnetic radiation wave wavelength within the UV and VIS spectral regions, and to vary a fourth electromagnetic radiation wave wavelength within NIR and SWIR spectral regions;
 interacting the third electromagnetic radiation wave with the first electromagnetic radiation wave and the second electromagnetic radiation wave to cause parametric amplification of the third electromagnetic radiation wave and the fourth electromagnetic radiation wave, wherein wave dispersion in the first photonic crystal fiber causes phase matching of the pair of electromagnetic radiation waves, the third electromagnetic radiation wave, and the fourth electromagnetic radiation wave, and wherein parametric amplification is achieved by four wave mixing;
 emitting the third electromagnetic radiation wave and the fourth electromagnetic radiation wave from the first photonic crystal fiber based on the four wave mixing; and
 frequency doubling at least one of the third electromagnetic radiation wave and the fourth electromagnetic radiation wave through a nonlinear crystal to generate at least one of a frequency doubled third electromagnetic radiation wave and a frequency doubled fourth electromagnetic radiation wave within an ultraviolet (UV) to visible (VIS) spectral region.

7. The method of claim 6, further comprising:
launching the fourth electromagnetic radiation wave into a second nonlinear crystal phase matched to generate a second harmonic signal; and
recycling the second harmonic signal into the pump laser.

8. The method of claim 6, further comprising:
generating a Raman conversion or supercontinuum by at least in part launching the third electromagnetic radiation wave or the fourth electromagnetic radiation wave into a second photonic crystal fiber.

9. The method of claim 6, further comprising:
emitting the fourth electromagnetic radiation wave from the first photonic crystal fiber; and
frequency converting the emitted fourth electromagnetic radiation wave.

10. The method of claim 6, further comprising generating a brightness output associated with the UV light of $M^2<10$.

11. The system of 1, wherein the frequency doubled third electromagnetic radiation wave is within the ultraviolet spectral region to the visible spectral region and the fourth electromagnetic radiation wave is within a shortwave infrared spectral region.

\* \* \* \* \*